May 6, 1947.　　　　B. G. OLVING　　　　2,420,188
AUTOMATIC ELECTRIC TOASTER
Filed Jan. 6, 1945　　　　3 Sheets-Sheet 1
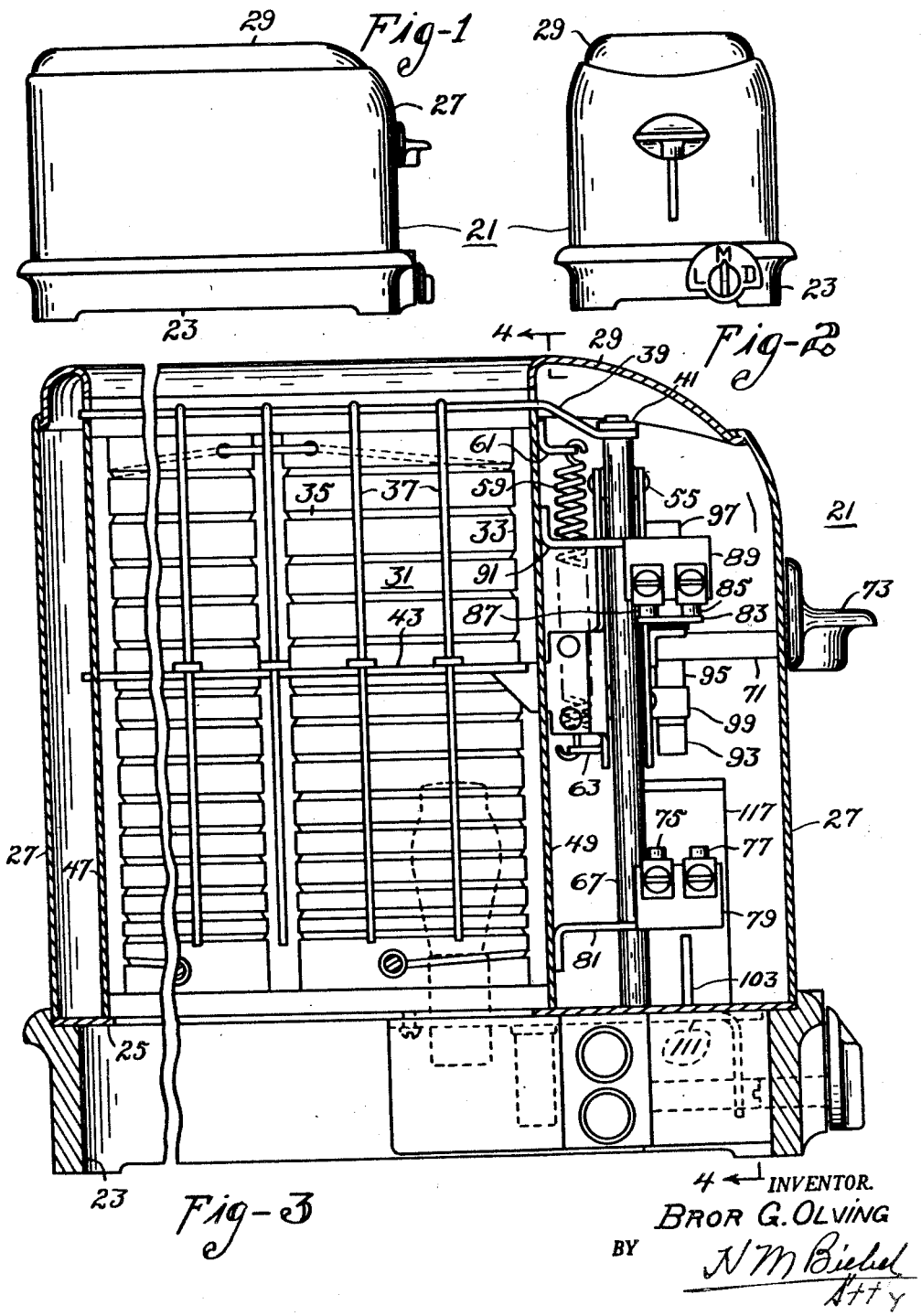
INVENTOR.
BROR G. OLVING
BY
N. M. Biebel
Atty

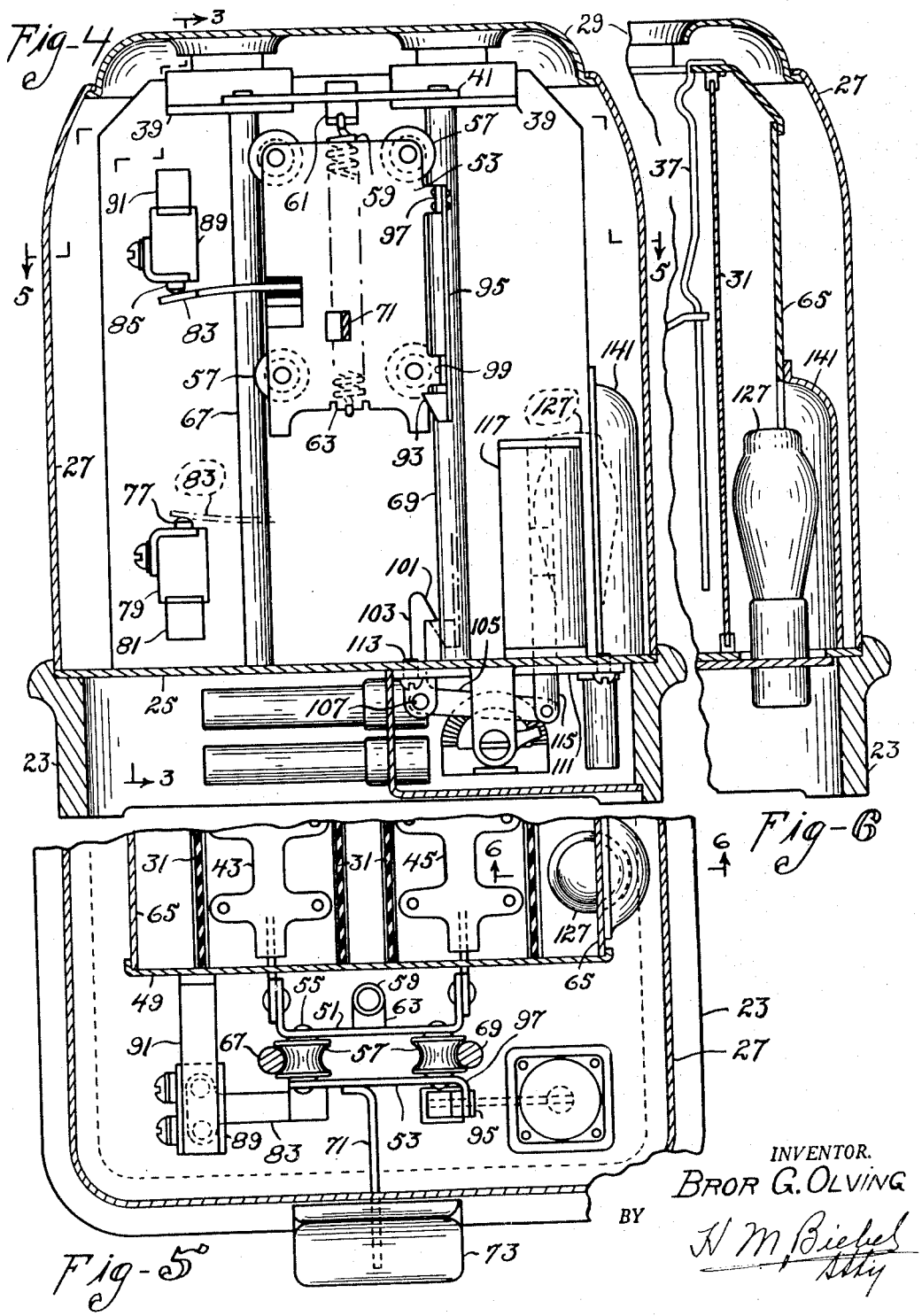

May 6, 1947. B. G. OLVING 2,420,188
AUTOMATIC ELECTRIC TOASTER
Filed Jan. 6, 1945 3 Sheets—Sheet 3
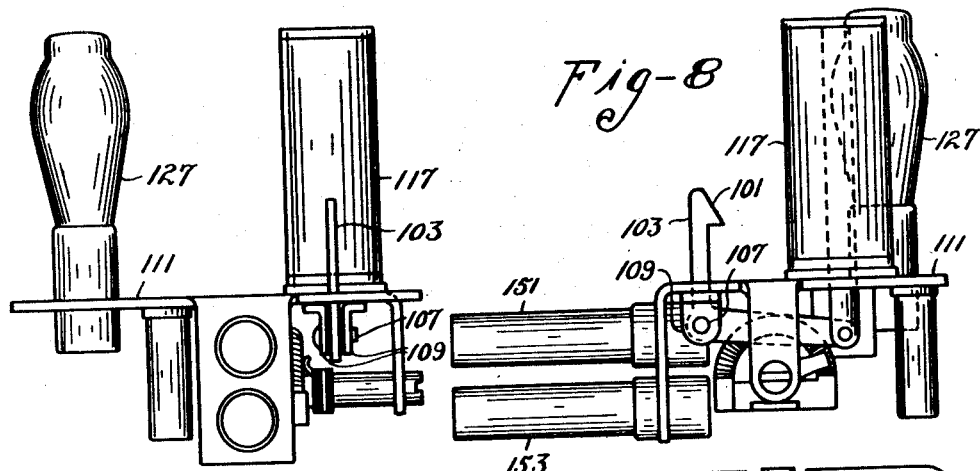
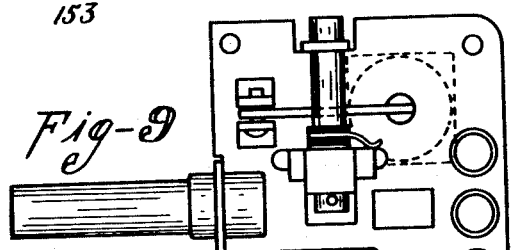
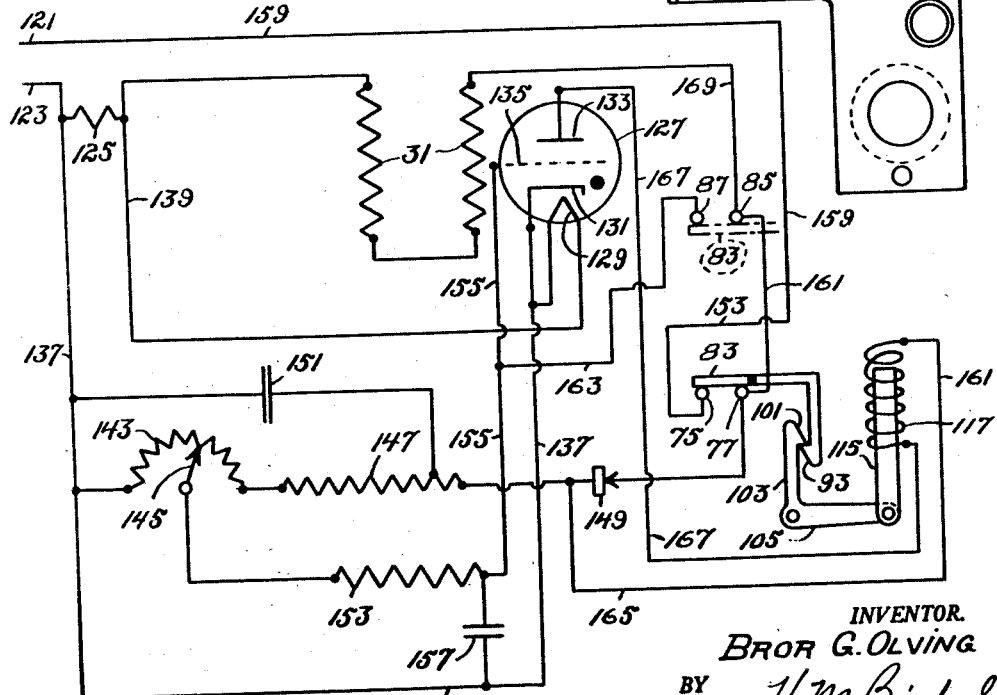
INVENTOR.
BROR G. OLVING
BY H. M. Bickel
Att'y Patented May 6, 1947

2,420,188

UNITED STATES PATENT OFFICE 2,420,188

AUTOMATIC ELECTRIC TOASTER

Bror G. Olving, Elgin, Ill., assignor to McGraw Electric Company, Elgin, Ill., a corporation of Delaware Application January 6, 1945, Serial No. 571,630

3 Claims. (Cl. 99—326)

My invention relates to automatic electric toasters and particularly to timing means for fixing the length of a toasting operation.

An object of my invention is to provide a timing means and an electric circuit therefor which are dependable and which will stand up in service for a relatively very long time.

Another object of my invention is to provide a timing means the action of which depends upon the inherent electrical characteristics of its component parts and the operation of which is not dependent on or controlled by any energy supplied from mechanical or thermal storage devices.

Another object of my invention is to provide a timing means and an electric circuit therefor, including an electron tube to obtain the above-mentioned performance.

In the drawings,

Figure 1 is a side elevational view of a toaster having operatively associated therewith a device and system embodying my invention, Fig. 2 is a front elevational view of the toaster shown in Fig. 1, Figs. 1 and 2 being on a reduced scale, Fig. 3 is a longitudinal, vertical, sectional view through a toaster having associated therewith a device and circuit embodying my invention, Fig. 4 is a lateral, vertical, sectional view therethrough taken on the line 4—4 of Fig. 3, Fig. 5 is a fragmentary horizontal, sectional view taken on the line 5—5 of Fig. 4, Fig. 6 is a fragmentary vertical, sectional view taken on the line 6—6 of Fig. 5 showing an electron tube in relation to the toast heating elements, Fig. 7 is a view in side elevation of a timing element, Fig. 8 is an end view of the parts shown in Fig. 7, Fig. 9 is a bottom view of the parts shown in Figs. 7 and 8, and, Fig. 10 is a diagram of connections embodying the invention.

Referring first of all to Figs. 1 to 9 inclusive, I have there shown a standard two-slice domestic fully-automatic toaster designated generally by number 21. This toaster includes a bottom frame 23 which is preferably made of molded composition material and which has positioned against its upper surface a thin metallic base plate 25 as well as an outer casing 27. The outer casing is provided with an upper cover member 29 all in a manner now well known in the art.

I have elected to show a two-slice toaster comprising four vertical, planar heating elements 31, which comprise one or more sheets 33 of electric-insulating material such as mica, on which is wound a strip 35 of a suitable resistor material. I provide also a plurality of vertical guard and guide wires 37 which are supported as by upper hook shaped end portions from substantially longitudinally extending top frame plates 39. These top frame plates are held in proper spaced positions by a cross bar 41. No specific details as to the construction and means for supporting and holding the toast heating elements 31 and of the guard wires 37 are here given since all of this forms no part of my present invention but is shown merely to illustrate the application of the parts constituting my invention thereto.

I provide also a pair of bread carriers 43 and 45, the rear end portions of which extend through vertical slots in a rear intermediate wall 47, while the front end portions extend through vertical slots in a front intermediate wall 49 also in a manner now well known in the art. A rear carriage plate 51 has backwardly bent end portions secured to the front end portions of the carriers 43 and 45. A front carriage plate 53 is also provided and is spaced from the rear carriage plate 51 as by a plurality of headed studs 55, one at each corner of the front and rear carriage plates, on which studs are mounted grooved rollers 57, one at each corner of the front and the rear carriage plates.

I provide means for yieldingly holding the bread carriers in their upper or non-toasting position comprising a tension spring 59, the upper end of which is connected to a bracket 61 secured against the front surface of the front intermediate wall 49 adjacent to the upper end thereof, while the lower end of spring coil 59 is connected to a rearwardly bent lug 63 constituting a part of the rear carriage plate 51. The normal non-operating position of the carriers 43 and 45 is that shown in full lines in Fig. 3 of the drawings which is called the non-toasting position, while the carriers are moved downwardly into their toasting position adjacent the lower end portions of the respective toasting chambers constituted by one of the inner toast heating elements 31 and an outer baffle plate 65 as well as the rear and the front intermediate walls 47 and 49. The externally grooved rollers 57 are adapted to engage the inner part of the surface of a pair of vertically extending rods 67 and 69. The upper end portions of the rods 67 and 69 extend through openings in the front end portions of the top frame plates 39 as well as through openings in the cross bar 41.

Means for causing downward movement of the bread carriers and of the parts mechanically connected therewith and described hereinbefore comprises a bar 71 which extends forwardly of the front carriage plate 53 and through a vertical slot in the outer casing 27, which has a knob 73 secured thereto which is in front of the front surface of the front portion of the outer casing 27. Downward pressure by an operator's finger on knob 73 will cause downward movement of the two bread carriers 43 and 45 into their lowermost toasting positions.

Means for controlling the energization of the toast heating elements 31 comprises a pair of fixed contacts 75 and 77 which are mounted on a block 79 of electric-insulating material which is supported by a bracket 81 secured to the front intermediate wall 49 adjacent the lower end portion thereof and in position to be engaged by a contact bridging member 83 when the bread carriers are in their lowermost or toasting position. Contact bridging member 83 is insulatedly supported on front carriage plate 53.

I provide also a second pair of fixed contacts 85 and 87 which are mounted on a block 89 of electric-insulating material which is supported by a bracket 91 secured to the front intermediate wall adjacent the upper end portion thereof, in a position to be engaged by the contact bridging member 83 which is insulatedly supported on the front carriage plate, when the bread carriers are in their upper or non-toasting position.

Means for holding the carriers in their toasting position comprise a hook member 93 which is secured to the lower end portion of a bar 95 of resilient material, the upper end portion of which is secured to a lug 97 constituting a part of the front carriage plate 53 adjacent the upper end portion thereof. The spring bar 95 is biased in a clockwise direction and normally rests against a lug 99 also constituting a part of the front carriage plate 53 and extending forwardly therefrom adjacent the lower right hand end portion thereof. When the bread carriers are moved into their lower or toasting position, hook 93 is adapted to engage the hook shaped end 101 of a latch of substantially L-shape including in addition to the hook 101 at the end of a substantially vertically extending arm 103, a second arm 105 extending substantially horizontally, the two arms being pivoted as on a short shaft 107 supported by a pair of brackets 109 secured to the under surface of a plate 111 which is adapted to be secured against the lower surface of bottom plate 25 by a plurality of short machine screws 113.

The outer or free end of arm 105 is pivotally connected with a vertically extending armature core 115 which is adapted to be energized by a coil 117 which is also supported on plate 111 extending substantially vertically thereof. It is evident that when the bread carriers are moved downwardly into toasting position, the hook 93 will engage with hook-shaped end 101 to hold the carriers in their toasting position and that when coil 117 is energized, armature core 115 will be moved upwardly to disengage hook end 101 from hook 93 with the result that spring 59 will cause quick upward movement of the bread carriers into their non-toasting positions.

Referring now to Fig. 10 of the drawings, I have there illustrated a diagram of connections constituting particularly my present invention to be described and claimed in the instant application. I provide a pair of supply circuit conductors, 121 and 123 to cause energization of the series connected toast heating elements 31 through a small resistor 125 connected in series electric circuit with the two toast heating elements 31.

I provide an electron tube 127 of the grid controlled rectifier type, having a heated filament 129, an indirectly heated cathode 131, a plate anode 133, as well as a grid 135. The filament 129 is energized by the small resistor 125, the resistance of which is such that when traversed by the current traversing either one pair of series connected toast heating elements 31 or by the current traversing the two pairs (in a two-slice toaster), is such as to properly energize the hot filament. One terminal of resistor 125 is connected to one terminal of the hot filament 129 by a conductor 137 while the other terminal of resistor 125 is connected by a conductor 139 to the other terminal of the hot filament 129. The cathode 131 is connected to conductor 137 and therefore to one terminal of the hot filament 129. It may be here pointed out that the design and construction of the electron tube 127 is such that its firing voltage is in predetermined relation relatively to the temperature thereof and that I subject the electron tube 127 to radiant heat from at least one of the toast heating elements 31 as by locating it in an opening in one of the baffle plates 65, a closure 141 being provided adjacent the outer surface of tube 127.

I provide a potentiometer 143 having a manually-adjustable contact arm 145 to permit of including more or less of the resistance of the potentiometer in a circuit. The ohmic resistance of potentiometer 143 may be on the order of 300 ohms and one terminal thereof is connected to conductor 137 while the other terminal thereof is connected to one terminal of a relatively large resistor 147, the ohmic resistance of which may be on the order of 3000 ohms. The other terminal of resistor 147 is connected in series circuit with a rectifier 149 which may be of the half-wave dry-type rectifier type. The other terminal of rectifier 149 is connected to fixed contact 77.

A filter or ballast condenser 151 is connected between conductor 137 and across the major portion of resistor 147 in order to smooth out voltage ripples of the rectified potential.

The fixed terminal of adjustable contact arm 145 is connected to one terminal of a timing resistor 153 having an ohmic resistance on the order of 10 megohms, the other terminal of which is connected to grid 135 by a conductor 155. A timing condenser 157 having a capacitance on the order of 10 microfarads is connected to the junction of conductor 155 with one terminal of timing resistor 153 while the other terminal of timing condenser 157 is connected to conductor 137.

Supply circuit conductor 121 is connected by a conductor 159 to fixed contact 75. The second fixed contact 77 is connected by a conductor 161 with the upper fixed contact 85, while the second upper fixed contact 87 is connected by a conductor 163 with conductor 155. The junction of one terminal of resistor 147 and of the rectifier 149 is connected by a conductor 165 to one terminal of coil 117, while the other terminal of coil 117 is connected by a conductor 167 to plate electrode 133. The other terminal of one of the toast-heating elements 31 is connected by a conductor 169 to fixed contact 85.

One of the well known characteristics of a mercury vapor type of current-controlled rectifier tube such as tube 129 is that for a constant anode or plate voltage across the tube, the firing voltage of the grid decreases as the temperature of the mercury vapor of the tube increases. For example, one particular tube having a plate potential of 150 volts D. C. (peak value) will fire or become conducting at a grid voltage of plus 6 volts when the temperature of the mercury vapor is 25 degrees C. while it will fire at a grid voltage of plus 4 volts when the temperature of the mercury vapor is 50 degrees C., and will fire at plus 2 volts at a mercury vapor temperature of 80 degrees C.

Assuming that such a tube is employed in the circuit shown in Fig. 10 and that the potentiometer 143 is adjusted to deliver 8 volts to the timing circuit and that the tube is operating at 25 degrees C., and assuming further that the timing resistor 153 and condenser 157 of the timing circuit are so designed that the voltage across the timing condenser 157 will build up to 6 volts in 3 minutes, then tube 127 will become conducting 3 minutes after energization of the circuit and current passing through tube 129 and coil 117 will cause release of the latch 101 and termination of a toasting operation. The path of the current traversing coil 117 and tube 127 may be traced as follows: from supply circuit conductor 121 through conductor 159, through closed main switch comprising contacts 75, 77 and bridging member 83, through a conductor to rectifier 149, conductor 165, coil 117, conductor 167, through tube 127, and then through conductor 137 to the other supply circuit conductor 123. When all of the various elements including the potentiometer 143, the timing resistor 153, and the timing condenser 157, have been properly correlated relatively to each other, it is evident that the desired degree of toasting of one or two slices of bread placed in the toaster will have been properly effected. Assuming that additional slices of bread are toasted in quickly following succession, the electron tube 127 will be subject to an increase of temperature which will cause it to fire at lower grid voltage as hereinbefore set forth so that the length of a toasting operation will be reduced. The voltage across the timing condenser increases as a logarithmic function of time and it is of course possible to match the working part of this curve against the time heating characteristic curve of the toaster.

Let it be assumed that an operator desires to toast a slice or slices of bread to a greater degree than would be effected with the position of the manually adjustable contact arm 145 of potentiometer 143. Moving the contact arm 145 in a clockwise direction will have the effect of shortening the timing cycle because of the impression of a greater voltage upon the timing resistor 153 and therefore upon the timing condenser 157, while if contact arm 145 is moved in a counterclockwise direction, a greater degree of toasting, that is, a longer time period, will result.

If now the supply circuit voltage should be very high, the operating temperature of the resistor 35 would also be relatively higher than would be the case if operated on normal voltage. The temperature of tube 127 would therefore also be higher, with the result of the tube becoming conductive sooner than it would at a somewhat lower temperature.

Various modifications may be made in the devices embodying my invention without departing from the spirit or scope thereof and all such modifications coming clearly within the scope of the appended claims are to be considered a part of my invention.

I claim as my invention:

1. In an automatic electric toaster the combination with a toasting chamber, electric toast heating means therein, a control switch for the heating means biased to open position, means to move the switch to closed position to start a toasting operation and a latch for holding the switch in closed position, of means for causing release of said latch to terminate a toasting operation comprising a potentiometer, a timing condenser, a timing resistor connected to said potentiometer and said timing condenser to charge the latter, an electron tube connected to the timing condenser to be fired thereby at a predetermined potential of the condenser, means energized by the current traversing the tube for causing release of the latch and termination of a toasting operation, said tube being located in the toasting chamber and having a firing potential decreasing with increase of temperature to reduce the duration of a toasting operation with increase of temperature of the toasting chamber and means comprising said control switch for causing discharge of said timing condenser at the termination of a toasting operation.

2. The combination with an electric toaster having a toasting chamber, electric toast heating means in said toasting chamber, a control switch for said heating means biased to open position, a bread carrier movable into toasting and non-toasting positions relatively to said toast heating means and biased into non-toasting position, means for moving said switch into closed position and said carrier into toasting position and a releasable latch for holding said switch in closed position and said carrier in toasting position, of means for causing release of said latch to terminate a toasting operation comprising a potentiometer, a timing condenser, a timing resistor connected to said potentiometer and said timing condenser to charge the latter, an electron tube connected to the timing condenser to be fired thereby at a predetermined potential of the condenser, means energized by the current traversing the tube for causing release of the latch and termination of a toasting operation, said tube being located in the toasting chamber and having a firing potential decreasing with increase of temperature to reduce the duration of a toasting operation with increase of temperature of the toasting chamber and means for causing discharge of said timing condenser at the termination of a toasting operation.

3. The combination with an electric toaster having a toasting chamber, electric toast heating means in said toasting chamber adapted to be connected to an alternating supply circuit, a control switch for said heating means biased to open position and having a contact bridging member, a bread carrier movable into toasting and non-toasting positions and biased to non-toasting position, means for moving said switch into closed position and said carrier into toasting position and a releasable latch for holding said switch in closed position and said carrier in toasting position, of means for causing release of said latch to terminate a toasting operation comprising a rectifier, an adjustable potentiometer connected in series circuit with said rectifier, a timing condenser, a timing resistor connected to said potentiometer and said timing condenser to charge the latter to an increasing potential, an electron tube connected to the timing condenser to be fired thereby at a predetermined potential, means actuated by the current traversing the tube for causing release of the latch and termination of a toasting operation, said tube being located in the toasting chamber and having a firing potential decreasing with increase of its temperature to reduce the duration of a toasting operation with increase of temperature of the toasting chamber and means including said contact bridging member and said toast heating means for causing discharge of said timing condenser at the termination of a toasting operation.

BROR G. OLVING.

REFERENCES CITED

The following references are of record in the file of this patent:

UNITED STATES PATENTS

| Number | Name | Date |
| --- | --- | --- |
| 2,061,011 | Vingerhoets | Nov. 17, 1936 |
| 2,207,871 | Myers | July 16, 1940 |
| 2,215,404 | Myers | Sept. 17, 1940 |
| 2,317,228 | Shroyer | Apr. 20, 1943 |
| 2,331,025 | Grooms | Oct. 5, 1943 |
| 2,364,998 | Palmer et al. | Dec. 12, 1944 |
| 2,182,124 | Guerra | Dec. 5, 1939 |
| 2,361,446 | Anderson | Oct. 31, 1944 |